(12) United States Patent
Innis

(10) Patent No.: US 6,675,960 B2
(45) Date of Patent: Jan. 13, 2004

(54) HOLDER FOR AN OPTICAL DISC

(76) Inventor: John Innis, 1193 N. Lancaster Cir., South Elgin, IL (US) 60177

( * ) Notice: Subject to any disclaimer, the term of this patent is extended or adjusted under 35 U.S.C. 154(b) by 20 days.

(21) Appl. No.: 10/059,743

(22) Filed: Jan. 29, 2002

(65) Prior Publication Data

US 2003/0141206 A1 Jul. 31, 2003

(51) Int. Cl.$^7$ ................................................ B65D 85/57
(52) U.S. Cl. .................... 206/308.1; 206/493; 206/217; 220/212; 220/256.1; 220/694; 220/709; 220/729; 220/215; 220/386; 220/395
(58) Field of Search ..................... 206/308.1, 309–313, 206/303, 493, 216, 217, 232; 211/40, 41.12; D6/407; 220/212, 256.1, 694, 705, 709, 729, 521; 215/228, 229, 386, 394, 392, 395

(56) References Cited

U.S. PATENT DOCUMENTS

| | | | | |
|---|---|---|---|---|
| 2,306,726 A | | 12/1942 | Hasin | 274/42 |
| 2,690,253 A | | 9/1954 | Francois | 206/45.33 |
| 2,773,727 A | * | 12/1956 | Bradley | 312/9.9 |
| 2,850,158 A | | 9/1958 | Woodward | 206/62 |
| 3,163,288 A | | 12/1964 | Arvidsson | 206/63.3 |
| 3,199,768 A | | 8/1965 | Farmlett | 229/68 |
| 4,018,355 A | * | 4/1977 | Ando | 220/522 |
| 4,060,100 A | * | 11/1977 | Miller et al. | 138/89 |
| D280,802 S | * | 10/1985 | Cho | D9/446 |
| 4,879,710 A | | 11/1989 | Iijima | 369/291 |
| 5,542,532 A | * | 8/1996 | Mitchell | 206/308.1 |
| 5,620,271 A | | 4/1997 | Bergh et al. | 402/79 |
| 5,732,818 A | | 3/1998 | Koehn | 206/308.1 |
| 6,016,908 A | | 1/2000 | Gaetano | 206/308.1 |
| 6,070,752 A | | 6/2000 | Nava et al. | 220/521 |
| 6,089,384 A | * | 7/2000 | Watson et al. | 211/40 |
| 6,112,891 A | * | 9/2000 | Wohl et al. | 206/223 |
| 6,164,445 A | * | 12/2000 | Cooper | 206/308.1 |
| D456,166 S | * | 4/2002 | Seltzer | D6/407 |

FOREIGN PATENT DOCUMENTS

| | | | | |
|---|---|---|---|---|
| DE | 10042832 A1 | * | 3/2002 | B65D/43/00 |
| GB | 2155446 A | * | 9/1985 | B65D/51/24 |

\* cited by examiner

*Primary Examiner*—Mickey Yu
*Assistant Examiner*—Jila M. Mohandesi
(74) *Attorney, Agent, or Firm*—Thomas R. Vigil; Welsh & Katz, Ltd.

(57) ABSTRACT

The holder for an optical disc comprises a sheet of plastic material deformed to include a flat generally circular or annular portion having an outer circular edge and an inner circular edge; an at least partially annular first flange portion depending from the outer circular edge a short distance to an inwardly extending first detent formation and an at least partially annular second flange portion depending from the inner circular edge a short distance to an outwardly extending second detent formation, the holder being adapted to receive an optical disc against the flat circular portion and between the first and second flange portions and held in that location by the first and second detent formations.

15 Claims, 3 Drawing Sheets

HOLDER FOR AN OPTICAL DISC

BACKGROUND OF THE INVENTION

1. Field of the Invention

The present invention relates to a holder for an optical disc, a DVD, a compact disc or a mini-compact disc which may have advertising, promotional, informative or entertaining media thereon. The holder is designed for easy opening and is molded or formed from a thermoplastic sheet of material and has structure for attaching the holder to a lid or cover for a beverage cup, to a box containing a product, or to a bottle, such as a bottle containing a beverage.

2. Description of the Prior Art

Heretofore various packaging techniques have been proposed for holding and displaying an optical or compact disc. The simplest of these prior art packages or carriers is a package made up of two sheets of flexible, clear or translucent, plastic material that are sealed together and cut along a square periphery and around a disc disposed between the two sheets. Typically, this is done by cutting and heat sealing the overlapping sheets in a generally square pattern.

In the manufacture of such a package, a first sheet is placed on a planar support surface followed by placing a compact disc on the first sheet, placing a second sheet over the disc and the first sheet and then, with a dielectric or radio frequency welding die, the package is formed by applying measured heat and pressure in a square pattern around the disc, thus sealing the disc between two square sheets of plastic material.

Numerous other packages or carriers comprising, for example, rigid plastic plates hinged together to form a small thin box have also been proposed. Still further, recent packages or carriers for compact discs are disclosed in the following U.S. patents:

| U.S. Pat. No. | Patentee |
| --- | --- |
| 2,306,726 | Hasin |
| 2,690,253 | Francois |
| 2,850,158 | Woodward |
| 3,163,288 | Arvidsson |
| 3,199,768 | Farmlet |
| 4,879,710 | Iijima |
| 5,620,271 | Bergh et al. |
| 5,732,818 | Koehn |
| 6,016,908 | Gaetano |
| 6,070,752 | Nava et al. |

SUMMARY OF THE INVENTION

According to the present invention there is provided a holder for an optical or compact disc comprising a sheet of plastic material deformed to include a flat generally circular or annular portion having an outer circular edge and an inner circular edge; an at least partially annular first flange portion depending from the outer circular edge a short distance to an inwardly extending first detent formation and an at least partially annular second flange portion depending from the inner circular edge a short distance to an outwardly extending second detent formation, the holder being adapted to receive an optical disc against the flat circular portion and between the first and second flange portions and held in that location by the first and second detent formations.

DESCRIPTION OF THE PREFERRED EMBODIMENT(S)

Figure 1:
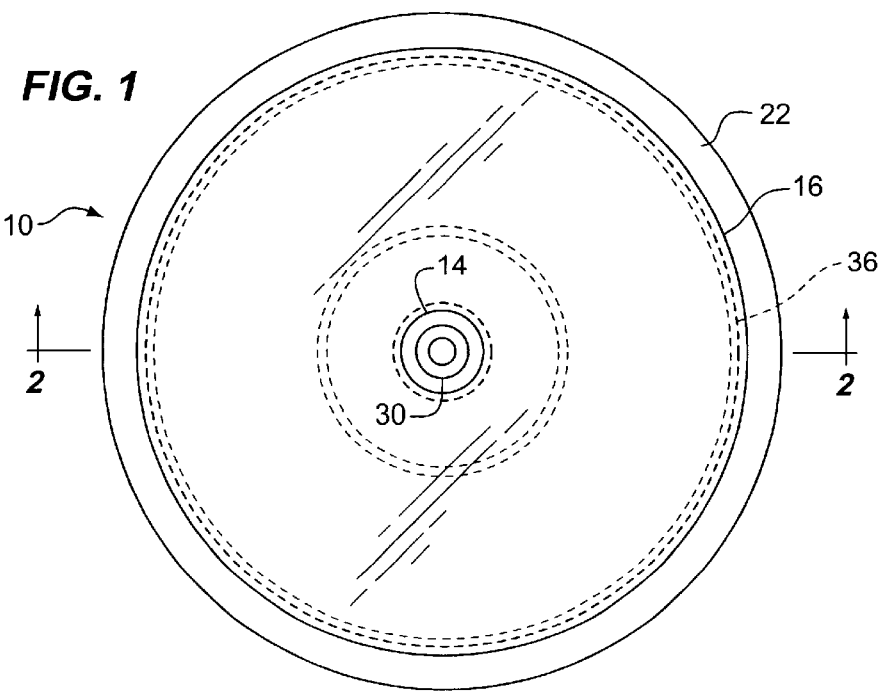
FIG. 1 is a top plan view of one embodiment of a holder for an optical or compact disc constructed according to the teachings of the present invention.

Referring to the drawings in greater detail, there is illustrated in FIG. 1, a holder 10 constructed according to the teachings of the invention. The holder 10 is molded, formed or deformed from a single sheet of plastic material to the shape illustrated in FIGS. 1 and 2.

Figure 2:
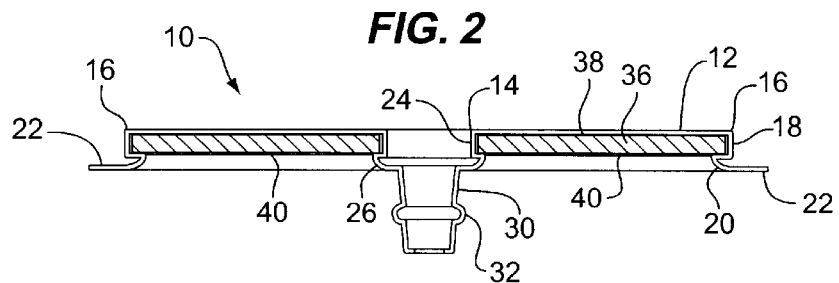
FIG. 2 is a cross-sectional view of the holder for the disc shown in FIG. 1 and is taken along 2—2 of FIG. 1.

As best shown in FIG. 2, the holder 10 has a flat circular or annular portion 12 which extends between an inner circular edge 14 and an outer circular edge 16. At the outer circular edge 16 is a first depending flange 18 which extends downwardly a short distance to a first detent formation 20 which extends radially inwardly, downwardly and then radially outwardly to a partially or fully annular flange 22.

At the inner circular edge 14 is a second depending flange 24 which extends downwardly to a second detent formation 26 which extends radially outwardly, downwardly and then radially inwardly to a conical or tubular structure 30. On the outer surface of the tubular structure 30 is formed a third detent formation 32 which forms an annular projection 32 which extends around the tubular structure 30.

It is to be noted that the detent formations 20, 24 and 32 are generrally U-shaped in cross-section.

As best shown in FIG. 2, an optical, compact or mini compact disc (known as a "Mini Round") 36, is pressed past the first and second detent formations 20 and 26 into an annular space 38 formed within the holder 10 between the flat annular portion 12 and the depending annular flanges 18 and 24.

Preferably, an annular cover sheet 40, which can be made of paper or plastic, is also inserted with the compact disc 36 into the space 38 and held between the disc 36 and the first and second detent formations 20 and 26, as shown.

Figure 3:
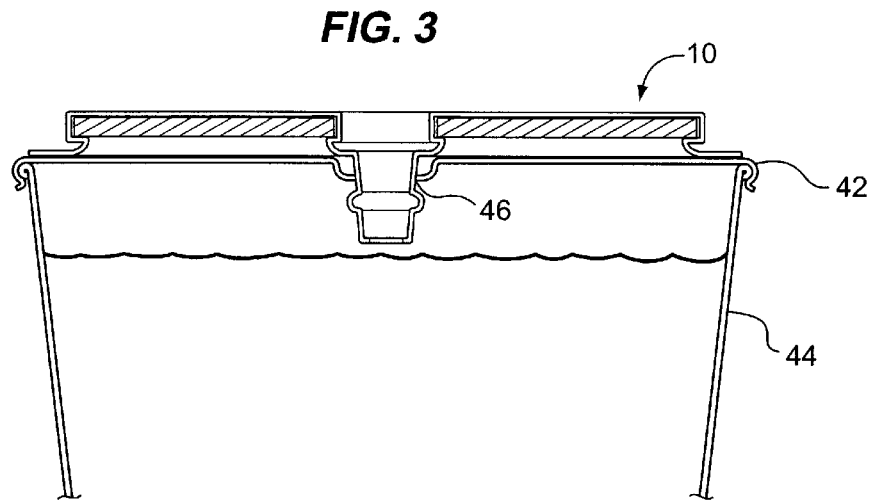
FIG. 3 is a side elevational view, patially in section, of the holder with a an optical or compact disc mounted to a lid or cover for a beverage cup.

Referring now to FIG. 3, the holder 10 shown in FIGS. 1 and 2 is adapted to be mounted on a cover or lid 42 for a beverage cup 44 by inserting the conical or tubular structure 30 through a circular or cross opening 46 in the cover or lid 42 which is provided in the cover or lid 42 for receiving a straw.

The third detent formation 32 engages against the underside of the lid or cover 42 to hold the holder 10 and disc 36 against the lid or cover 42 while a user of the beverage cup 44 is drinking liquid through a straw from the beverage cup 44. Then, when the user has finished drinking the beverage, the user can take the cover or lid 42 off the beverage cup 44 in order to remove the disc 36 from the holder 10.

The plastic material from which the holder 10 is made is preferably a clear plastic material to enable one to see any legend or other information or indicia on the compact disc 36.

Figure 4:
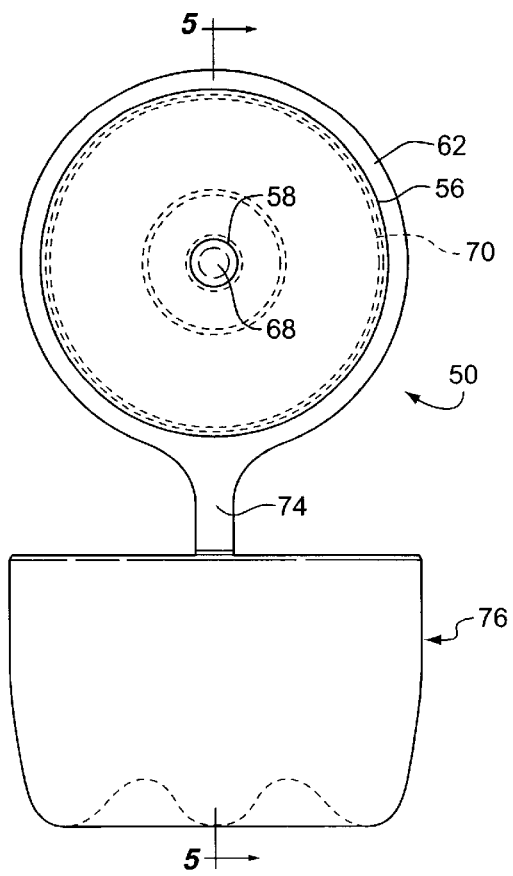
FIG. 4 is a top plan view, with portions broken away, of another embodiment of a holder for an optical or compact disc constructed according to the teachings of the present invention where a second detent extends completely across a central area of a flat generally circular portion of the holder and a second flat portion extends outwardly to a cup-shaped receptacle.
Figure 5:
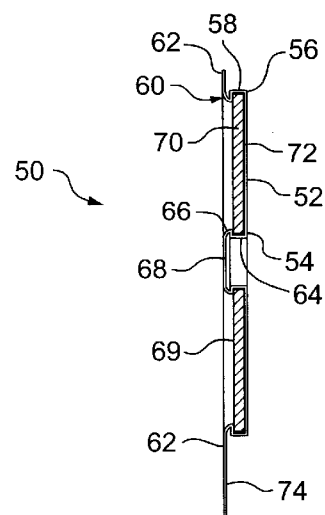
FIG. 5 is a side elevational view of the holder shown in FIG. 4, partially in section, with a disc mounted in the holder and the holder including the cup-shaped recptacle and a flat planar portion extending to the cup shaped receptacle.

Referring now to FIGS. 4 and 5, there is illustrated therein another embodiment of a holder 50 constructed according to the teachings of the present invention. This holder 50 has a flat, generally circular or annular portion 52 which extends between an inner edge 54 and an outer edge 56. A first depending flange 58 extends downwardly from the outer edge 56 to a first detent formation 60 which extends first inwardly, then downwardly and then outwardly to an annular flange 62. A second inner depending flange 64 extends downwardly from the inner edge 54 of the flat annular portion 52 to a second detent formation 66 which extends outwardly, downwardly and then inwardly to, and forming part of a lower central, circular portion 68 of the holder 50.

This portion 68 is generally disc or circular shaped and extends completely across the central area of the holder 50, as shown.

If desired, an annular sheet 69 of material, which can be made of plastic or paper, is inserted with a disc 70 into a space 72 formed between the depending flanges 58 and 64.

Then a flat planar portion 74 extends outwardly to a cup-shaped receptacle 76. The cup-shaped receptacle 76 enables a bottle to be placed in the cup-shaped receptacle 76 for holding the disc 70 to a bottle.

The receptacle 76 is molded form the sheet of plastic material and, for a bottle which has an annular groove above a lower body portion, can have an annular, inwardly extending upper edge 77 which can snap over the upper edge of the body portion into the annular groove to in the bottle to hold the bottle to the disc holder 50.

If desired, alternate ridges 78 and grooves 79 can be provided in the cup shaped receptacle 76 for mating with grooves and ridges in the lower body portion of a beverage bottle, e.g., a 22 oz. water, soda or juice bottle.

Figure 6:
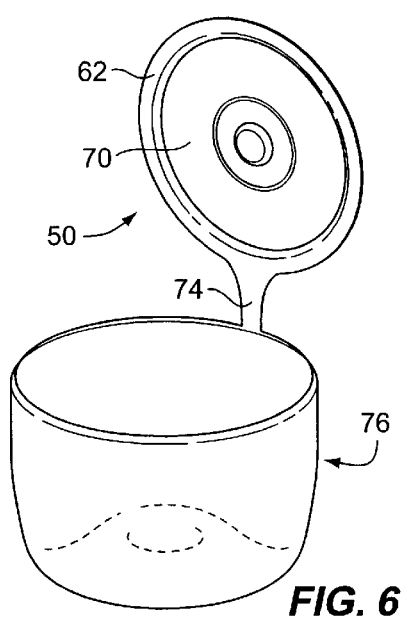
FIG. 6 is a side perspective view of the holder shown in FIG. 5.

A perspective view of the holder 50 is shown in FIG. 6.

It should be understood that when the user of the holder 50 for attachment to a beverage bottle is finished drinking the beverage or liquid in the bottle, he or she can then pull the annular flange 62 radially outwardly from the optical disc 70 to enable the disc 70 to be snapped out of the holder 50.

Figure 7:
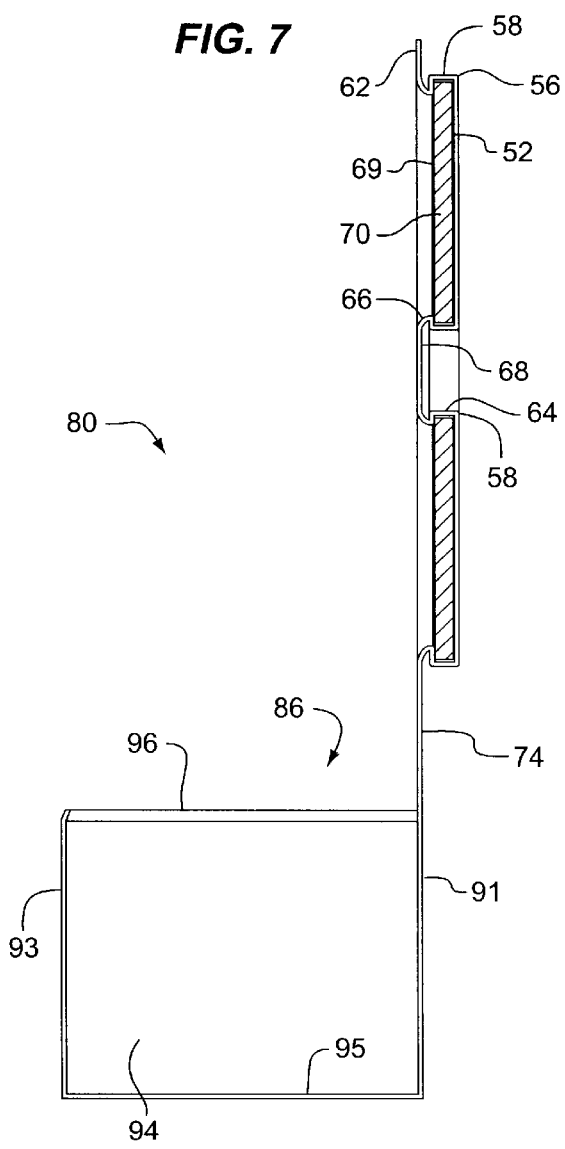
FIG. 7 is a side elevational view of still another embodiment of a holder constructed according to the teachings of the present invention, partially in section, with an optical or compact disc mounted in the holder and the holder including a box-shaped receptacle and a flat planar portion extending to the box shaped receptacle.
Figure 8:
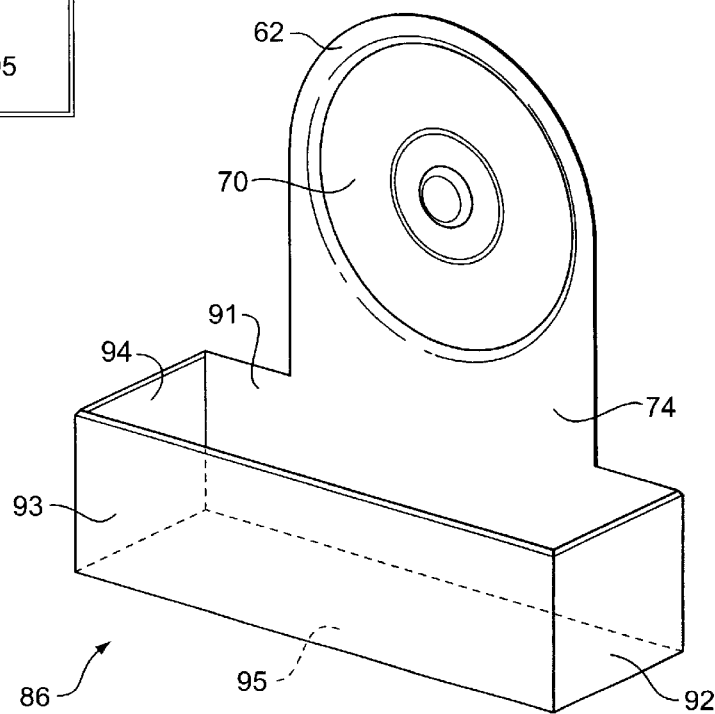
FIG. 8 is a side perspective view of the holder shown in FIG. 7.

In FIGS. 7 and 8., there is illustrated still another embodiement of a holder 80 constructed according to the teachings of the present invention. Here the holder 80 has the same construction of the holder 50 up to the plate portion 74. Then, instead of the cup-shaped receptacle 76, the holder 80 has a box-shaped receptacle 86 including, as a continuation of the flat portion 74, a first wall 91. As shown, a second wall 92 is connected to the first wall 91, a third wall 93 is connected to the second wall 92, a fourth wall 94 is connected to the and between the third and first wealls 93 and 91, and a bottom wall or bottom flange 95 can be connected to at least two of the four walls 91–94.

If desired, and as shown, an upper edge 96 of the box-shaped receptacle 86 can extend inwardly to form a gripping edge for gripping the sides of a box received in the box-shaped receptacle 86.

The box-shaped receptacle 86 can be constructed to receive different sized boxes. In one preferred embodiment it is contemplated that the box-shaped receptacle 86 will be approximately the same size as a cereal box so that a cereal box can be received in the box-shaped receptacle 86. In this way the holder 80 can be used for attaching an optical disc to a cereal box.

It is to be understood that the radial extent of the flat, generally circular or annular portion 12 or 52 can be large enough to receive a full optical or can be smaller for receiving a mini compact disc, or "Mini Round."

"Mini Rounds" are becoming very popular for providing different media to the consuming public, primarily to youngsters. In this respect, the media can be an advertisement, a preview of a new movie to be released soon, games or other information. Vendors of beverages and food products will find the holder 10, 50 or 80 of the present invention to provide an inexpensive, simple and effective structure for holding an optical disc, such as a "Mini Round" to a cover or lid for a beverage cup, to a bottle containing a beverage or to a box containing a product.

From the foregoing description, it will be appreciated that the holder 10, 50 or 80 of the present invention has a number of advantages, some of which have been described above and others which are inherent in the invention. In particular, it provides protection to an optical disc or a compact disc such as a "Mini-Round" and provides viewing of the printed information on the "mini-Round", easy fixing of the "Mini-Round" in the holder 10, 50 or 80 and a simple, inexpensive structure for attaching the holder to a lid or cover for a beverage cup, to a bottle containing a beverage or to a box containing a product.

Also, it will be understood that modifications can be made to the holder 10, 50 or 80 of the present invention without departing from the teachings of the present invention.

For example, a web portion can be integral with and extend outwardly from the outer annular flange 22 to a ring portion which can be inserted over a neck at the top of a bottle or can be fixed to a cap structure for the bottle. In this embodiment, the holder 10, with the modified structure described above, will hang or depend from the neck of a bottle.

Alternatively, a central opening in the holder 10 can be sized to snap over a bottle cap on a bottle and be supported by the neck of the bottle.

Accordingly, the scope of the invention is only to be limited as necessitated by the accompanying claims.

I claim:

1. A holder for a single optical disc, said holder comprising a single piece of plastic material deformed to include a flat generally circular or annular portion having an outer circular edge and an inner circular edge; an at least partially annular first flange portion extending from said circular or annular portion at said outer circular edge a short distance to a diametrically inwardly extending first detent formation and an at least partially annular second flange portion extending from said circular or annular portion at said inner circular edge approximately the same short distance to a diametrically outwardly extending second detent formation, said holder being adapted to receive an optical disc against said flat circular or annular portion and between said first and second flange portions and held in that location by said first and second detent formations, the single optical disc being snap-fittingly inserted past said detent formations and between said first and second flanges and held against said flat circular or annular portion only by said detent formations.

2. The holder of claim 1 wherein said second detent formation extends in a complete circle and extends first outwardly, second, downwardly, and then inwardly to a cylindrical or conical tubular portion that depends from said second detent formation.

3. The holder of claim 2 wherein said cylindrical or conical tubular portion has an annular detent formed thereon for retaining said tubular portion positioned in a central opening in a cover or lid for a beverage cup.

4. The holder of claim 1 including an annular sheet of material between said detent formations and an optical disc received in said holder.

5. The holder of claim 4 wherein said sheet of material is made of paper.

6. The holder of claim 1 wherein said piece of plastic material includes a web portion that extends from said annular flange of said first detent formation to a ring portion which is received over a neck of a bottle.

7. The holder of claim 1 wherein said piece of plastic material includes a web portion which extends from said annular flange of said first detent formation to a ring portion which is associated with a cap structure for a neck of a bottle.

8. The holder of claim 1 wherein said inner circular edge defines a central opening in said holder which is sized to snap over a bottle cap on a bottle whereby said holder can be supported by a neck of the bottle.

9. A older for an optical disc, said holder comprising a piece of plastic material deformed to include a flat generally circular or annular portion having an outer circular edge and an inner circular edge, an at least partially annular first flange portion extending from said circular or annular portion at said outer circular edge a short distance to a diametrically inwardly extending first detent formation and an at least partially annular second flange portion extending from said circular or annular portion at said inner circular edge a short distance to a diametrically outwardly extending second detent formation, said holder being adapted to receive an optical disc against said flat circular or annular portion and between said first and second flange portions and held in that location by said first and second detent formations, and said first detent formation extending to an annular flange and a flat planar portion of said piece of plastic material extending from said annular flange of said first detent formation to a receptacle.

10. The holder of claim 9 wherein said receptacle is a generally rectangular or box-shaped receptacle that is sized to receive a portion of a box containing a product.

11. The holder of claim 9 wherein said receptacle is a cup-shaped receptacle configured to receive a bottom of a bottle.

12. The holder of claim 11 wherein said cup-shaped receptacle has an upper circular edge including at least one inwardly extending third detent which is adapted to snap over a shoulder on a lower body portion of a bottle to hold said cup-shaped receptacle to the bottle.

13. The holder of claim 12 wherein said third detent extends substantially around the bottle.

14. The holder of claim 11 wherein said cup-shaped receptacle has ridges and grooves which are sized to register with grooves and ridges on the bottom of a bottle.

15. The holder of claim 11 wherein said cup-shaped receptacle is sized to receive a 2 liter bottle for a liquid.

\* \* \* \* \*